US011954961B2

(12) United States Patent
Hobmeier

(10) Patent No.: US 11,954,961 B2
(45) Date of Patent: Apr. 9, 2024

(54) METHOD FOR PROCESSING SHEET PRODUCTS

(71) Applicant: GIESECKE+DEVRIENT CURRENCY TECHNOLOGY GMBH, Munich (DE)

(72) Inventor: Ralf Hobmeier, Munich (DE)

(73) Assignee: GIESECKE+DEVRIENT CURRENCY TECHNOLOGY GMBH, munich (DE)

( * ) Notice: Subject to any disclaimer, the term of this patent is extended or adjusted under 35 U.S.C. 154(b) by 0 days.

(21) Appl. No.: 18/016,034

(22) PCT Filed: May 26, 2021

(86) PCT No.: PCT/EP2021/025191

§ 371 (c)(1),
(2) Date: Jan. 13, 2023

(87) PCT Pub. No.: WO2022/012774

PCT Pub. Date: Jan. 20, 2022

(65) Prior Publication Data

US 2023/0274601 A1 Aug. 31, 2023

(30) Foreign Application Priority Data

Jul. 14, 2020 (DE) ..................... 10 2020 004 230.9

(51) Int. Cl.
*G07D 11/50* (2019.01)

(52) U.S. Cl.
CPC ......... *G07D 11/50* (2019.01); *G07D 2211/00* (2013.01)

(58) Field of Classification Search
CPC ........ G07D 11/50; G07D 11/00; G07D 11/16; G07D 11/23; G07D 11/30
USPC .............................. 235/379, 375; 705/35–45
See application file for complete search history.

(56) References Cited

U.S. PATENT DOCUMENTS

2005/0263582 A1* 12/2005 Yokoi .................... B65H 31/22 235/379
2010/0059586 A1* 3/2010 Lee ...................... G07D 11/009 235/379
2021/0327200 A1* 10/2021 Ihara ...................... G07D 11/12

FOREIGN PATENT DOCUMENTS

KR 101754319 B1 * 7/2017 ......... G07D 11/0084
WO 200913442 A1 1/2009

OTHER PUBLICATIONS

International Search Report from corresponding PCT Application No. PCT/EP2021/025191, dated Sep. 7, 2021.

* cited by examiner

*Primary Examiner* — Edwyn Labaze
(74) *Attorney, Agent, or Firm* — Workman Nydegger

(57) ABSTRACT

A method is for processing sheet material, in particular value papers, such as banknotes, checks, etc., in which different groups of sheet material are processed one after the other. The different groups of sheet material are separated for processing. In the processing of different groups of sheets materials, which are separated from one another by separation cards arranged respectively at the beginning of the different groups of sheet material, a first processing, in which separation cards and unrecognized sheet material are sorted out, should be followed by a second processing of the sorted-out separation cards and of the unrecognized sheet material, in which separation cards to which no unrecognized sheet material is assigned are sorted out.

8 Claims, 2 Drawing Sheets

METHOD FOR PROCESSING SHEET PRODUCTS

BACKGROUND

The present invention relates to a method for processing sheet material, in particular value papers such as banknotes, tickets, vouchers, checks, etc., in which different groups of sheet material are processed one after the other, wherein the different groups of sheet material are separated for processing by means of separation cards.

In methods for processing different groups of sheet material, e.g. value papers such as banknotes, tickets, vouchers, checks, etc., with banknote processing machines, which can be deposits from different depositors, for example, the different groups of sheet material (hereinafter referred to as banknotes for the sake of simplicity) are separated by means of separation cards. The separation cards are inserted between the different deposits to separate them. The separation cards are preferably arranged at the beginning of the group of banknotes forming the respective deposit. The separation cards have a unique identifier and can contain information, for example, about the depositor and/or about the deposit. Furthermore, the separation cards are adapted in such a manner that they are automatically recognized as separation cards during processing by the banknote processing machine and the unique identifier or information is detected. As a result, the banknote processing machine can book the assigned group of banknotes for the corresponding deposit or for the corresponding depositor.

In addition, the separation cards are used to identify for further processing such banknotes that cannot be processed during processing by the banknote processing machine, e.g. since they could not be recognized as an authentic banknote or not recognized at all. For this purpose the separation cards are transported to and stored in a special output compartment. During processing, all banknotes from a deposit that cannot be processed are transported to the special output compartment and stored after the associated separation card. The processable banknotes, i.e. the recognized banknotes, are processed as intended and booked for the respective deposit, e.g. to an account of the depositor. This procedure is repeated for the further deposits. First, the separation card of a deposit is transported to the special output compartment and stored, subsequently, if present, any banknotes that cannot be processed; processable banknotes are processed as intended and booked for the respective deposit.

SUMMARY

However, the known method has the disadvantage that a large number of separation cards are collected in the special output compartment, to which, however, there are assigned unproces sable banknotes only as an exception. In the subsequent processing of the separation cards and banknotes collected in the special output compartment therefore a great effort is required to sort out separation cards that are not relevant for further processing, because there are no unprocessable banknotes assigned to these separation cards.

The object of the present invention is therefore to state a method for processing sheet material, in particular value papers such as banknotes, tickets, vouchers, checks, etc., in which different groups of sheet material are processed one after the other, wherein the different groups of sheet material are separated for processing by means of separation cards arranged at the beginning of groups of sheet material, which permits a simplified processing of separation cards and unprocessable sheet material.

The invention starts out from a method for processing sheet material, in particular value papers such as banknotes, tickets, vouchers, checks, etc., in which different groups of sheet material, which are separated from one another by means of separation cards arranged respectively at the beginning of the different groups of sheet material, are processed one after the other by a sheet material processing machine, wherein the separation cards and the sheet material are checked by means of a sensor device and a control device and transported to and stored in different output units of the sheet material processing machine in accordance with their recognition, with a first processing of the separation cards and the different groups of sheet material by the sheet material processing machine, in which the separation cards and unrecognized sheet material are stored in a first output unit, whereas recognized sheet material is stored in further output units; according to the invention, a second processing of the separation cards stored in the first output unit and the unrecognized sheet material is provided, wherein separation cards to which no unrecognized sheet material is assigned are stored in a second output unit, whereas separation cards to which at least one piece of unrecognized sheet material is assigned are stored in the first output unit, wherein the unrecognized sheet material is checked again by means of the sensor device and the control device and, if recognized, is stored in the output units, with the exception of the first and second output unit, whereas, if unrecognized, it is stored in the first output unit.

The advantage of the invention can be seen in particular in the fact that the usually large number of separation cards to which no unprocessable sheet material is assigned, are sorted out automatically, so that the otherwise customary great manual effort of sorting out these separation cards, since they are not relevant for further processing due to no unprocessable sheet material being assigned to these separation cards, is omitted.

According to a development, it is provided to remove the separation cards stored in the second output unit after the second processing without further processing.

The advantage of the development can be seen in particular in the fact that the automatically sorted out separation cards can be simply removed and do not have to be processed further.

According to another development, it is provided that the separation cards stored in the first output unit after the second processing, as well as the unrecognized sheet material assigned thereto, are removed and processed again.

The advantage of the development can be seen in particular in the fact that, after the second processing, only those separation cards have to be further processed to which there was actually assigned sheet material that was not recognized in the first processing.

According to a further development, it is provided to repeat the second processing at least once.

The advantage of the development can be seen in particular in the fact that by repeating the second processing, sheet material previously classified as unrecognizable can be partially recognized, as a result of which manual rework is reduced.

According to yet a further development, it is provided that the separation cards stored in the first output unit after the second or further processing are removed and not processed further if no unrecognized sheet material is assigned thereto.

The advantage of the development can be seen in particular in the fact that the separation cards do not have to be processed further since the processing is complete.

According to yet a further development, it is provided that the sensor device and the control device recognize that no unrecognizable sheet material is assigned to a separation card if, during processing, a separation card is followed by a further separation card or if a separation card is the last piece of sheet material to be processed.

The advantage of the development can be seen in particular in the fact that it can be recognized without great effort whether unrecognizable sheet material is assigned to a separation card.

According to yet another development, it is provided that already during the first processing of the separation cards and different groups of sheet material by the sheet material processing machine, such separation cards to which no sheet material is assigned or which are the last piece of sheet material to be processed, are transported to and stored in the second output unit, controlled by the control device, wherein the sensor device and the control device recognize that no sheet material is assigned to a separation card if a separation card is followed by a further separation card, or if the separation card is the last piece of sheet material to be processed.

The advantage of the development can be seen in particular in the fact that thereby separation cards to which no sheet material is assigned or which are the last piece of sheet material to be processed are sorted out into the second output unit already during the first processing and do not have to be processed further.

BRIEF DESCRIPTION OF THE DRAWINGS

Further advantages of the present invention result from the dependent claims as well as the subsequent description of embodiment examples with reference to figures.

The figures are described as follows.

DETAILED DESCRIPTION OF VARIOUS EMBODIMENTS

In the following the processing of different groups of sheet material, e.g. value papers such as banknotes, tickets, vouchers, checks, etc., is described exemplarily based on the processing of different groups of banknotes, which are referred to as deposits in the following. The different deposits are separated from one another by separation cards arranged at the beginning of each deposit. A banknote processing machine is employed to process the different deposits.

Figure 1:
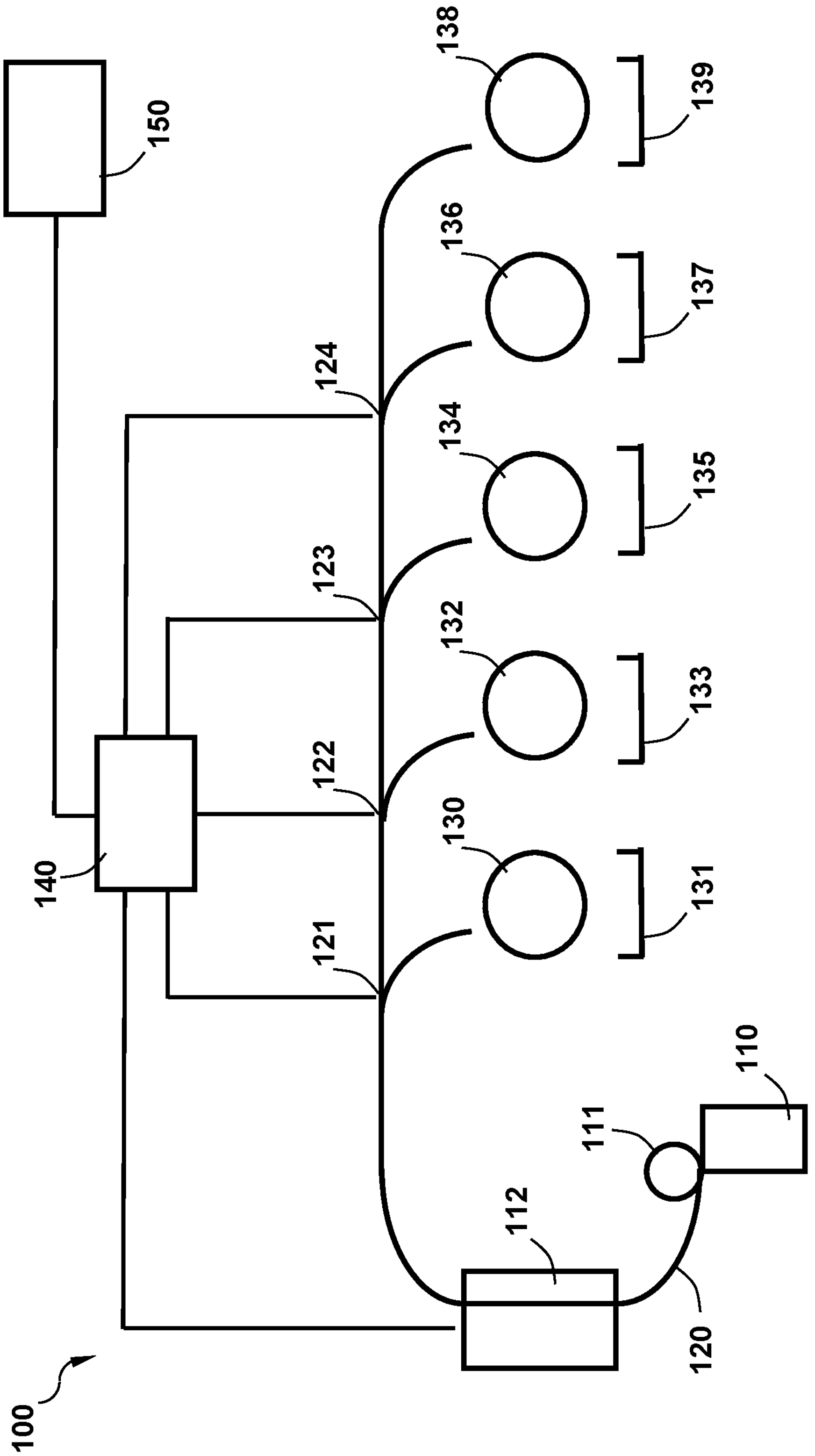
FIG. 1 a structure in principle of a banknote processing machine for processing different groups of sheet material, FIG. 2 an arrangement of several groups of sheet material with associated separation cards, and FIG. 3 the arrangement of several groups of sheet material with associated separation cards from FIG. 2, after a first processing by the banknote processing machine.

In FIG. 1 a structure in principle of a banknote processing machine 100 for processing different groups of banknotes or deposits is represented. The banknote processing machine 100 has an input unit 110, into which the different deposits are inserted. To the input unit 110 there is connected a singler 111 which removes the separation cards and individual banknotes of the different deposits from the input unit 110 and transfers them to a transport system 120. The transport system 120 transports the separation cards and the individual banknotes through a sensor device 112, which determines data from the banknotes, which for example permit conclusions about authenticity, state, currency, denomination, etc. In addition, the separation cards are recognized in the sensor device 112 and information contained on the separation card is detected by the sensor device 112. The ascertained data of the banknotes and the detected information of the separation cards are transferred to a control device 140, which evaluates the data and information and thus controls the further flow of the banknotes and/or separation cards through the banknote processing machine 100. For this purpose the control device 140 acts on switches 121 to 124, which are components of the transport system 120 and permit to transport and store, i.e. sort, the banknotes and/or separation cards in output units 130 to 139 in accordance with predetermined criteria. The output units 130 to 139 can for example be configured as spiral slot stackers, which store the banknotes and/or separation cards to be stored in receptacles 131, 133, 135, 137, 139 by means of rotating units 130, 132, 134, 136, 138 which have spiral slots.

As mentioned at the outset, the separation cards are used to recognize the limits of different deposits in automatic banknote processing. In addition, the separation cards make it possible to mutually delimit rejected banknotes, i.e. banknotes that cannot be processed, and make them assignable to the respective deposit, e.g. banknotes that were classified as fake, unrecognizable or otherwise problematic when checked by sensor device 112 and the control device 140, e.g. because more than one individual banknote was grasped by the singler 111. For this purpose, the separation cards and the rejected banknotes are output and stored in a first special output unit 130, 131, a so-called reject compartment.

The separation cards are documents that can be singled, transported and stacked in the banknote processing machine 100 like banknotes. Their configuration is adapted in such a manner that they can be clearly distinguished from banknotes and can therefore be recognized by the banknote processing machine 100. The separation cards differ from the banknotes to be processed in terms of physical properties such as size, shape and thickness, imprint, color and pattern or other features, such as magnetic regions.

A separation card can contain conductive elements that are printed or otherwise applied to the separation card. These conductive elements can also be verified in the case of multiple withdrawals, i.e. if instead of one banknote or separation card several banknotes or banknotes and separation cards are grasped by the singler 111, wherein there results an occlusion of the separation cards. It is of particular advantage when these patterns differ so clearly from conductive elements on banknotes (e.g. security thread or other applied conductive security elements) that even in the case of a multiple withdrawal with overlapping banknotes, the presence of a separation card is not displayed erroneously or a separation card present is not recognized. One possibility here is to apply several conductive bars to the separation card and to adapt the evaluation in such a manner that a separation card recognition only responds when at least three or four of these bars are present. The use of conductive patterns has the advantage over known methods, e.g. on the basis of magnetic bars, which also allow a recognition in the case of occlusion, that the conductivity is largely independent of the distance to the verifying measuring system and thus has a higher reliability. Another advantage is that the conductivity can also be verified even when the transport system is at a standstill or running very slowly, whereas a dependency of the signal strength on the transport speed is given in magnetic evaluation. Such conductive elements can be verified, for example, by sensors that feed in a high-frequency electric field at one point and have a receiver for high-frequency fields at another point. When a conductive transmission path is present, there results a capacitive coupling between the transmitter and the receiver and thus a reliable verification.

Other possibilities for the reliable recognition of a separation card are applied inductive elements or antenna coils. These can be wound in a conventional process in the form of a flat coil or can be printed on as a coil with the aid of conductive ink. Verification can take place, for example, by feeding in a high-frequency electrical field and through the interaction of this coil in the form of influencing the frequency of an oscillating circuit formed with the transmitter elements. A transponder (RFID) can likewise be employed, which also offers the advantage of saving data.

Further possibilities for the reliable recognition of a separation card exist through the expression of certain physical properties. This can be realized, for example, by a special rigidity of the carrier material, which can be verified by a force measurement at a deflection or in some other manner. Other recognition methods can be based on a specific configuration, e.g. in the behavior of the reflection of sound, the production of special sound waves during banknote transport or by special behavior when exposed to electromagnetic waves.

During preparation, the separation cards are inserted between the groups of banknotes of the different deposits, which are to be checked and accounted for separately. The separation cards are used as a header card, i.e. at the beginning of a deposit. The information on the deposits is usually acquired during the preparation. The deposit data, e.g. depositor, account number, amount of the deposit, etc., can be present e.g. in the form of an accompanying note (delivery note). This information can be applied by hand or printed in machine-readable manner, but it can also already be known because the depositor has already reported the deposit information by telephone (telebanking) or in some other way. The information assignment is produced e.g. by means of a unique identifier, e.g. a bar code, a 2D code or a sequence of digits on the separation card. In another application case it can occur that the value of the deposit is unknown and is to be determined only during the banknote processing.

The separation cards are distinguished from the banknotes and recognized by the sensor device 112 of the banknote processing machine 100 on the basis of their special features. In addition, the previously described information or unique identifiers of the separation cards are detected for further processing.

Figure 2:
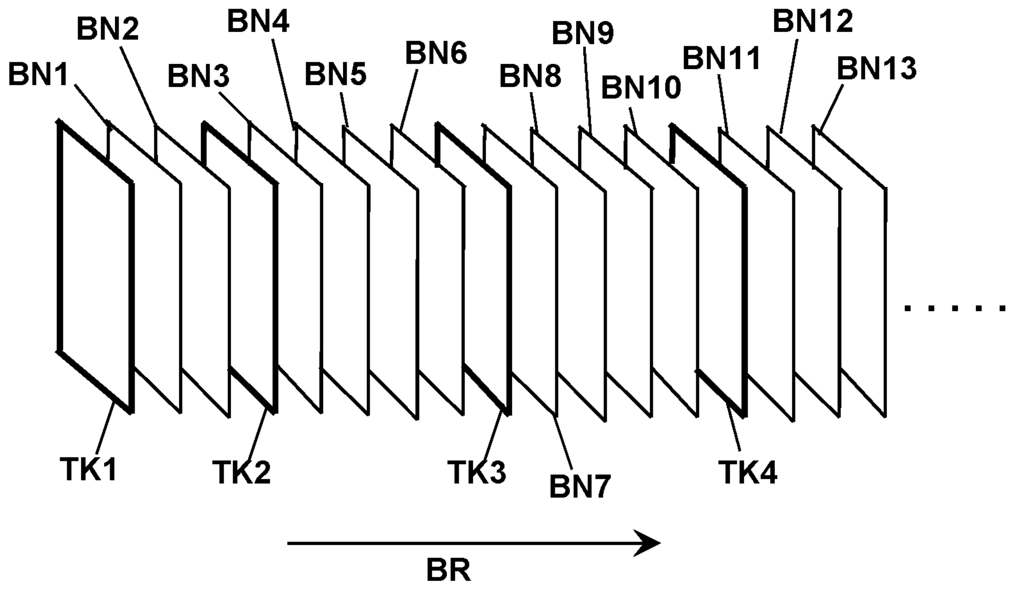

Based on the structure of groups of sheet material or deposits represented in FIG. 2, the processing of deposits will be described in more detail. In FIG. 2 a first deposit is represented, composed of a separation card TK1 and banknotes BN1 and BN2, a second deposit composed of a separation card TK2 and banknotes BN3 to BN6, and a third deposit composed of a separation card TK3 and banknotes BN7 to BN10 and a fourth deposit composed of a separation card TK4 and banknotes BN11 to BN13.

The deposits represented are processed in the direction of the arrow identified by the reference BR. The first separation card TK1 of the first deposit is thus first grasped by the singler 111 and transferred to the transport system 120, which transports the first separation card TK1 through the sensor device 112. The first separation card TK1 is detected by the sensor device 112 and the sensor data are evaluated by the control device 140, wherein the first separation card TK1 is recognized as a separation card and the information applied thereon is read. Controlled by the control device 140, the first separation card TK1 is then stored in the special output unit 130, 131. The banknotes BN1 and BN2 are processed subsequently by the banknote processing machine 100. For example, the banknotes BN1 and BN2 are to be recognized as authentic and their respective value is to be accounted for the first deposit. The banknotes BN1 and BN2 are stored in one of the output units 132 to 139, e.g. separately according to the ascertained values or denominations.

The second deposit is processed subsequently by the banknote processing machine 100 in the same manner. The second separation card TK2 is likewise stored in the special output unit 130, 131. However, the banknote BN3 is to be unprocessable, e.g. because it was recognized by the control device 140 as a forgery. For this reason, the banknote BN3 is likewise stored in the special output unit 130, 131. All further banknotes BN4 to BN6 of the second deposit are to be proces sable so that they are stored in one of the output units 132 to 139 according to their denomination and their respective value is accounted for the second deposit.

The third and fourth deposits are processed subsequently by banknote processing machine 100. The separation card TK3 of the third deposit is stored in the special output unit 130, 131, the banknotes BN7 to BN10 of the third deposit are to be processable, so that they are stored in one of the output units 132 to 139 according to their denomination and their respective value is accounted for the third deposit. The separation card TK4 of the fourth deposit is stored in the special output unit 130, 131, the banknotes BN11 to BN13 of the fourth deposit are to be proces sable, so that they are stored in one of the output units 132 to 139 according to their denomination and their respective value is accounted for the fourth deposit. Further deposits can follow subsequently, as indicated by the dotted line.

Figure 3:
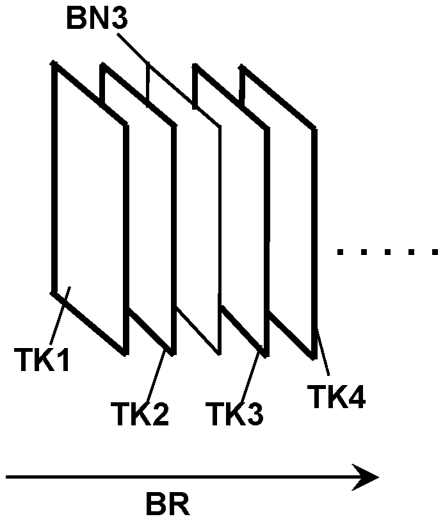

Thus, the situation represented in FIG. 3 results in the special output unit 130, 131 after the previously described first processing of the four deposits by the banknote processing machine 100. The separation card TK1 of the first deposit is followed by the separation card TK2 and the unprocessable banknote BN3, which is thus assigned to the second deposit. This is followed by the separation cards TK3 and TK4 of the third and fourth deposit.

For further processing and accounting of the deposits, the banknotes and separation cards are removed from the special output unit 130, 131 and processed again. This can be done at the banknote processing machine 100 or at a further banknote processing machine. For this purpose, the banknotes and separation cards removed from the special output unit 130, 131 are input again into the input unit 110 of the banknote processing machine 100. In principle, the second processing takes place in the same manner as described above for the first processing of the four deposits. Experience has shown that more than half of the banknotes rejected during the first processing are recognized as authentic or processable and are stored and accounted accordingly. It is also possible to carry out multiple reruns to further reduce the number of remaining unprocessable banknotes. The control unit 140 of the banknote processing machine 100 totals the results of the processed banknotes of all runs for each deposit based on the information on the separation cards, so that the repeated processing for the subsequent processing steps and computations takes place automatically and does not have to be taken into account further by an operator.

In contrast to the previously described first processing of the four deposits, however, in the second processing separation cards to which no banknotes are assigned are not stored in the special output unit 130, 131, but in another of the output units 132 to 139. For example, the output unit 132, 133 can be employed for this purpose. Certain banknote processing machines have two special output units, i.e. reject compartments, so that the first of the special output units is used for separation cards to which banknotes are assigned after the first processing, whereas the second special output unit is used for separation cards to which no banknotes are assigned after the first processing.

For the example shown in FIG. 3, this means that the separation cards TK1, TK3 and TK4 are stored in the second special output unit 132, 133, since they are the separation cards for the first, third and fourth deposits whose banknotes could be processed and accounted completely during the first processing. The separation card TK2 for the second deposit, in contrast, is stored in the special output unit 130, 131, since the unprocessable banknote BN3 is assigned to it.

During the second processing, along the processing direction BR, first the separation card TK1 of the first deposit is grasped by the singler 111 and transferred to the transport system 120, which transports the separation card TK1 through the sensor device 112. The separation card TK1 is detected by the sensor device 112 and recognized by the control device 140 as a separation card.

The singler 111 grasps the separation card TK2 subsequently, which is likewise recognized as a separation card by the interaction of the sensor device 112 and the control device 140. The control device 140 can deduce from the fact that the separation card TK1 is followed by the separation card TK2 that the separation card TK1 does not have an unprocessable banknote assigned thereto. For this reason, the control device 140 activates a switch 122 in order to store the separation card TK1 in the second special output unit 132, 133.

Subsequently, the singler 111 grasps the banknote BN3, the sensor device 112 and the control device 140 can deduce from this that this cannot be a separation card, since the separation card-typical features described above are missing. For this reason, the separation card TK2 of the second deposit is stored in the first special output unit 130, 131. If the banknote BN3 that was unprocessable during the first processing can be recognized and thus processed during the second processing, its value is accounted for the second deposit, and the banknote BN3 is stored in one of the output units 134 to 139, e.g. according to its denomination. If the banknote BN3 that was unprocessable during the first processing cannot be recognized during the second processing and therefore cannot be processed, it is stored again in the first special output unit 130 to 131.

After that, the separation card TK3 of the third deposit is grasped by the singler 111, followed by the separation card TK4 of the fourth deposit. Since the separation card TK3 is immediately followed by the separation card TK4, the separation card TK3, to which no unprocessable banknote is therefore assigned, is stored in the second special output unit 132, 133 under the control of the control device 140. Controlled by the control device 140, the separation card TK4 for the fourth deposit can also be stored in the second special output unit 132, 133, since it is the last piece of sheet material to be processed, which in the present example is not followed by any further banknotes or separation cards and therefore no unprocessable banknote is assigned to the separation card TK4. The fact that the separation card TK4 is the last piece of sheet material to be processed can be ascertained by the control device 140, for example, by a sensor being arranged in the input unit 110, e.g. a light barrier whose signals are evaluated to recognize that the input unit 110 is empty. If such a check is not possible, the separation card TK4 must be transported to and stored in the first special output unit 130 to 131, since the separation card TK4 is not followed immediately by a further separation card.

Depending on the previously described processability of the banknote BN3 from the second deposit, the following situation thus arises after the second processing. If the banknote BN3, which was unprocessable during the first processing, could be processed during the second processing, only the separation card TK2 is located in the first special output unit 130 to 131. The other separation cards TK1, TK3 and TK4 are located in the second special output unit 132, 133. The banknote BN3 was accounted for the second deposit and stored in one of the output units 134 to 139. If the banknote BN3 that could was unprocessable during the first processing could not be processed during the second processing either, the separation card TK2 and the banknote BN3 are located in the first special output unit 130 to 131. The other separation cards TK1, TK3 and TK4 are located in the second special output unit 132, 133. The separation cards TK1, TK3 and TK4 can thus be removed from the second special output unit 132, 133 without further processing steps being necessary.

In the event that the banknote BN3 that was unprocessable during the first processing could be processed during the second processing, the separation card TK2 can also be removed from the first special output unit 130 to 131 without further processing steps being necessary. In this case, the processing of the four deposits is complete.

If the banknote BN3 that was unprocessable during the first processing could not be processed during the second processing either, the separation card TK2 and the banknote BN3 must be removed from the first special output unit 130 to 131 and processed again.

This can be done by a third, fourth or further processing that corresponds to the second processing described above. However, it can also be provided that an operator assesses the unprocessable banknote BN3 and effects a final manual accounting for the second deposit.

In the approach described above, it is provided that only during the second or further processing of the banknotes and separation cards, such separation cards TK1, TK3, TK4, to which no unrecognized banknotes are assigned, or which are the last piece of sheet material to be processed, are transported to and stored in the second special output unit 132, 133 controlled by the control device 140. Deviating from this, it can also be provided to transport and store separation cards to which no banknotes are assigned or which are the last piece of sheet material to be processed in the second special output unit 132, 133 already during the first processing of the separation cards TK1-TK4 and banknotes BN1-BN13 by the sheet material processing machine 100. Thus, those separation cards are transported to and stored in the second special output unit 132, 133, which are not followed by a banknote, but immediately by a further separation card or are the last piece of sheet material to be processed during the first processing.

The invention claimed is:

1. A method for processing sheet material, in particular value papers such as banknotes, tickets, vouchers, checks, etc., in which different groups of sheet material, which are separated from one another by means of separation cards arranged respectively at the beginning of the different groups of sheet material, are processed one after the other by a sheet material processing machine, wherein the separation cards and the sheet material are checked by means of a sensor device and a control device and are stored in different output units of the sheet material processing machine in accordance with their recognition, with a first processing of the separation cards and the different groups of sheet material by the sheet material processing machine, in which the separation cards and unrecognized sheet material are stored in a first output unit, whereas recognized sheet material is stored in further output units, wherein second processing of the separation cards stored in the first output unit and the unrecognized sheet material, wherein separation cards to which no unrecognized sheet material is assigned are stored in a second output unit, whereas separation cards to which at least one piece of unrecognized sheet material is assigned are stored in the first output unit, wherein the unrecognized sheet material is checked again by means of the sensor device and the control device and, if recognized, is stored in the output units, with the exception of the first and second output units, whereas, if unrecognized, it is stored in the first output unit, wherein the sensor device and the control device recognize that no unrecognizable sheet material is assigned to a separation card if a separation card is followed by a further separation card, or if the separation card is the last piece of sheet material to be processed.

2. The method according to claim 1, wherein the separation cards stored in the second output unit after the second processing are removed and not processed further.

3. The method according to claim 1, wherein the separation cards stored in the first output unit after the second processing and the unrecognized sheet material assigned thereto are removed and processed again.

4. The method according to claim 1, wherein the second processing is repeated at least once.

5. The method according to claim 1, wherein the separation cards stored in the first output unit after the second or further processing are removed and not processed further, if no unrecognized sheet material is assigned thereto.

6. The method according to claim 1, wherein the groups of sheet material are deposits formed from banknotes and that the sheet material processing machine is a banknote processing machine.

7. The method according to claim 1, wherein during the first processing of the separation cards and different groups of sheet material by the sheet material processing machine, such separation cards to which no sheet material is assigned or which are the last piece of sheet material to be processed, are transported to and stored in the second output unit, controlled by the control device, wherein the sensor device and the control device recognize that no sheet material is assigned to a separation card if a separation card is followed by a further separation card, or if the separation card is the last piece of sheet material to be processed.

8. A method for processing sheet material, in particular value papers such as banknotes, tickets, vouchers, checks, etc., in which different groups of sheet material, which are separated from one another by means of separation cards arranged respectively at the beginning of the different groups of sheet material, are processed one after the other by a sheet material processing machine, wherein the separation cards and the sheet material are checked by means of a sensor device and a control device and are stored in different output units of the sheet material processing machine in accordance with their recognition, with a first processing of the separation cards and the different groups of sheet material by the sheet material processing machine, in which the separation cards and unrecognized sheet material are stored in a first output unit, whereas recognized sheet material is stored in further output units, wherein second processing of the separation cards stored in the first output unit and the unrecognized sheet material, wherein separation cards to which no unrecognized sheet material is assigned are stored in a second output unit, whereas separation cards to which at least one piece of unrecognized sheet material is assigned are stored in the first output unit, wherein the unrecognized sheet material is checked again by means of the sensor device and the control device and, if recognized, is stored in the output units, with the exception of the first and second output units, whereas, if unrecognized, it is stored in the first output unit, wherein during the first processing of the separation cards and different groups of sheet material by the sheet material processing machine, such separation cards to which no sheet material is assigned or which are the last piece of sheet material to be processed, are transported to and stored in the second output unit, controlled by the control device, wherein the sensor device and the control device recognize that no sheet material is assigned to a separation card if a separation card is followed by a further separation card, or if the separation card is the last piece of sheet material to be processed.

* * * * *